United States Patent [19]
Helgerud et al.

[11] 3,780,830
[45] Dec. 25, 1973

[54] CARTRIDGE-TYPE GREASE GUNS

[75] Inventors: Robert J. Helgerud, Hopkins; Ernest M. Simon, Golden Valley, both of Minn.

[73] Assignee: K-P Manufacturing Co., Inc., Minneapolis, Minn.

[22] Filed: Apr. 24, 1972

[21] Appl. No.: 246,728

[52] U.S. Cl............ 184/105 A, 184/38 R, 222/326
[51] Int. Cl............................................. G01f 11/06
[58] Field of Search................ 184/105 A, 28, 38 R, 184/105 C; 222/326, 383, 327, 386

[56] References Cited
UNITED STATES PATENTS

| | | | |
|---|---|---|---|
| 3,409,185 | 11/1968 | Sundholm | 222/326 |
| 3,612,359 | 10/1971 | Sundholm | 222/326 X |
| 3,174,657 | 3/1965 | Sundholm | 222/383 X |
| 3,300,100 | 1/1967 | Sundholm | 222/326 X |
| 2,409,619 | 10/1946 | Fitch | 222/386 |
| 2,915,226 | 12/1959 | Sundholm | 222/326 X |

FOREIGN PATENTS OR APPLICATIONS

| | | | |
|---|---|---|---|
| 992,344 | 5/1965 | Great Britain | 184/105 A |

*Primary Examiner*—Manuel A. Antonakas
*Attorney*—Ralph F. Merchant et al.

[57] ABSTRACT

An improved grease gun of the plunger type which uses replaceable grease cartridges. The grease gun consists of a cylindrical container adapted to receive an open ended cylindrical grease cartridge. The plunger is spring biased to urge grease from the cartridge into a discharging device of the piston displacement type. The plunger is guideably carried within the cylindrical container by an elongated rod having a handle portion projecting rearwardly from the container. To insure proper insertion of the plunger into the rearward open end of the grease cartridge, abutment means are disposed at an intermediate point on the elongated rod and movable therewith. Insertion of a fresh grease cartridge into the cylindrical container from its forward end causes the plunger to seat on the cartridge mouth. With the gun assembled for use, forward movement of the rod causes the abutment means to engage and force the plunger into a proper position within the cartridge mouth.

11 Claims, 4 Drawing Figures

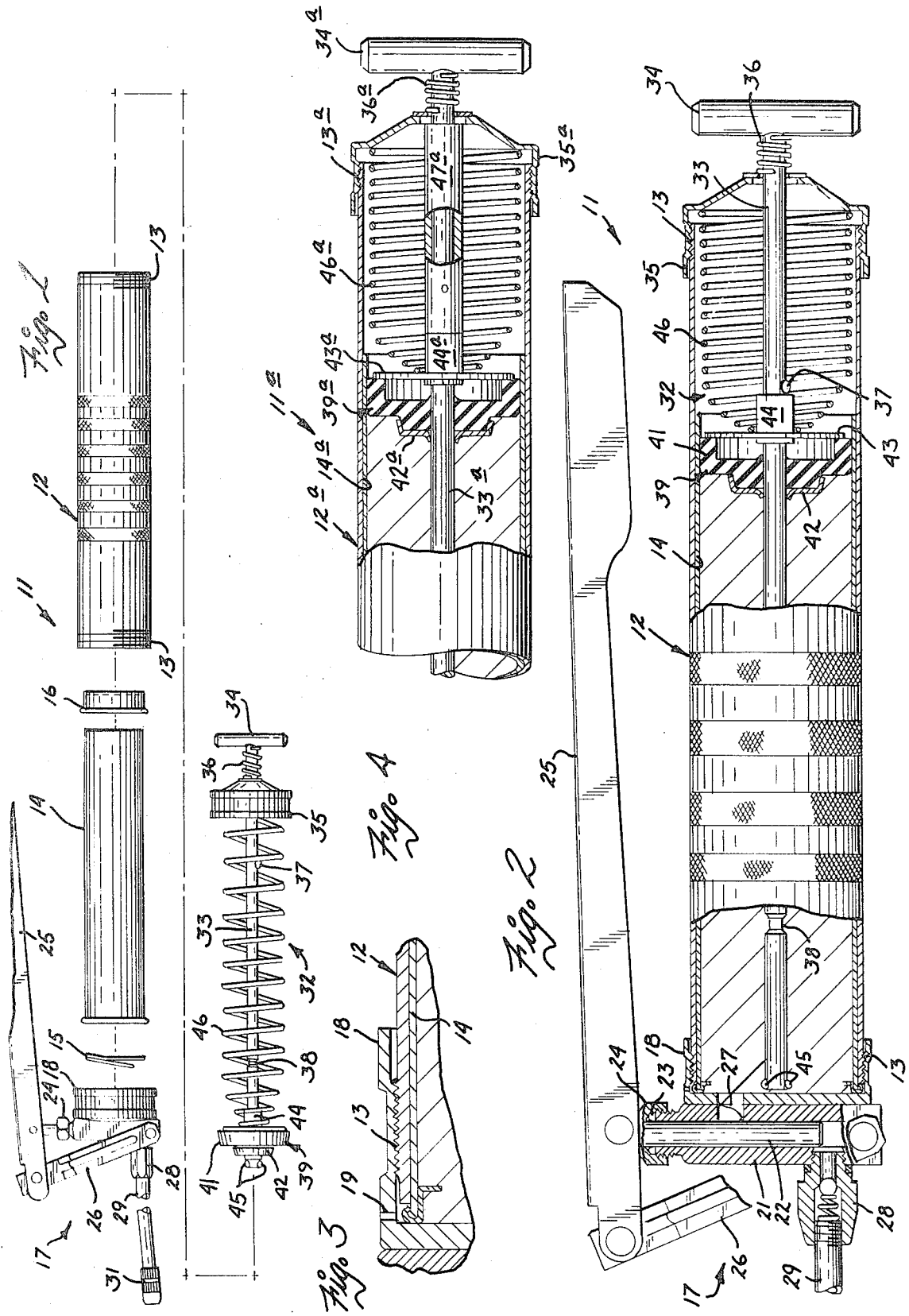

CARTRIDGE-TYPE GREASE GUNS

The invention is related generally to grease guns of the plunger type which use replaceable grease cartridges, and is specifically directed to an improved grease gun including means for effecting the positive placement of the plunger into the cartridge mouth.

Manually operated grease guns are extemely useful in many lubricating applications by reason of their portability, versatility, minimal size and simplicity of use. The development of replaceable grease cartridges has given the grease gun an additional advantage by obviating the messy and undesirable job of refilling the gun housing with grease when the supply runs low. With grease guns capable of using cartridges, replacement is effected simply by a partial disassembly of the gun, removal of the empty cartridge, insertion of a new one and reassembly. When cartridges of this type are used, it is, of course, necessary to employ a plunger or the like to expel grease from the cartridge into the grease discharge mechanism. For proper operation, the plunger must be properly positioned and seated in the open end of the cartridge to permit sealed, slideable movement through the entire length of the cartridge.

For economic reasons, the grease cartridges are usually formed from cardboard tubes. The tube ends often have a bead or burr on the inside edge, which resists entry of the plunger and may even cause improper entry. Improper entry can cause the cartridge mouth to partially collaspe or become otherwise deformed, thereby precluding proper plunger movement.

This is a problem which has persisted for some time without a practical solution. One attempt to solve the problem has been through the use of a plunger which, although normally slideable upon the elongated guide rod, is constructed to lockably cooperate with the extreme tip of the rod in such a manner that it can be rotated with and carried longitudinally by the rod. The objective of this structure is to enable the user to manipulate the rod in various manners until the plunger is forced into the cartridge mouth. This has proved to be a less than satisfactory solution for several reasons. First, since the fresh cartridge is full, the plunger is initially disposed in the rear-most portion of the gun container or housing. Since the plunger cooperates with the extreme tip of the elongated guide rod, it follows that the greater length of the rod projects outside of the housing, thus making it unwieldy in manipulating the plunger to its proper position. Further, with the elongated rod in this fully retracted position, it loses its primary function; i.e., to guide movement of the plunger within the cartridge. Consequently, properly aligned entry of the plunger into the open cartridge mouth becomes difficult. A further disadvantage of this particular structure arises from the need to release the rod from locking engagement with the plunger once the plunger has been inserted. This must be accomplished by manipulating the rod handle in a specific manner and without being able to observe the point at which the structural members can become disengaged.

Our improved grease gun provides a simple and practical solution to the problem of improper plunger insertion through the inclusion of abutment means disposed at an intermediate point on the elongated rod rearwardly of the plunger. The abutment means is disposed sufficiently close to the handle end of the elongated rod to enable insertion of the rod to its normal guide position within the cartridge before placement of the plunger. Insertion of a fresh cartridge causes the plunger to initially seat on the cartridge mouth, at which point the elongated guide rod is inserted through the grease cartridge until the abutment means engages the plunger. At this point, the handle does not project far beyond the end of the gun housing, and the user causes a proper aligned entry of the plunger into the cartridge mouth simply by pressing the handle forwardly.

Our invention further contemplates structure for effecting venting of the gun housing, thus exhausting virtually all air that would otherwise been entrapped in the cartridge end. Venting the gun housing in this manner offers the advantage of eliminating air locks from the gun, which prevent its proper operation.

BRIEF DESCRIPTION OF THE DRAWINGS

FIG. 1 is an exploded view of a grease gun embodying the inventive principle;

FIG. 2 is an enlarged view in side elevation of the inventive grease gun, portions thereof broken away and shown in section;

FIG. 3 is a further enlarged fragmentary and sectional view of means for venting the grease gun housing; and FIG. 4 is a fragmentary view of an alternative embodiment of the inventive principle, portions thereof broken away and shown in section.

DESCRIPTION OF THE PREFERRED EMBODIMENT

With initial reference to FIG. 1, an improved grease gun embodying the inventive principle is represented generally by the numeral 11. Grease gun 11 comprises an open ended cylindrical container or housing 12, the end portions of which are threaded, as at 13. Container 12 is adapted to receive a cylindrical grease cartridge 14 having removable end caps 15, 16. Cartridge 14 conventially takes the form of a cardboard tube, and the end caps 15, 16 are formed from the light weight, throw-away metal.

A head and handle assembly represented generally by the numeral 17 includes a threaded cap member 18 which screws onto the threaded portion 13 on the forward end of cylindrical container 12. As shown in FIG. 3, the threaded cap member 18 has a vent hole 19 formed therein, the purpose of which will be discused in further detail below.

With additional reference to FIG. 2, head and handle assembly 17 further comprises a cylinder housing 21 in which an elongated piston 22 is disposed for reciprocal movement. A piston packing 23 held in place by a packing nut 24 prevent the leakage of grease from the cylinder housing 21.

The upper end of piston 22 is pivotally connected to an elongated handle 25 at an intermediate point thereon. A link 26 is pivotally connected to the bottom of cylinder housing 21 and to the extreme forward end of the handle 25, thus allowing the handle 25 to be manually operated to reciprocate the piston 22 in its cylinder.

An opening 27 extending through the wall of cylinder housing 21 and the cap member 18 establishes communication between the piston cylinder and the forward end of cylindrical housing 21 with the unit assembled. A check valve assembly 28 communicates with the piston cylinder at its bottom end, and is constructed to threadably receive an outlet grease pipe 29 and coupler 31.

From the foregoing, it will be appreciated that with piston 22 moved to a retracted position above the opening 27, grease from the cartridge 14 can be admitted to the piston cylinder. Thereafter, downward movement of the piston 22, as effected by manual pumping movement of handle 25, forces a discrete quantity of grease through the check valve assembly 28, grease pipe 29 and coupler 31.

A plunger assembly for continuously urging grease in the cartridge 14 toward the head and handle assembly 17 is represented generally by the numeral 32 in FIGS. 1 and 2. Plunger assembly 32 comprises an elongated rod 33 having a greater length than the container 12, the rearward end thereof terminating in a handle 34. A threaded cap member 35 adapted to mate with the rearward threaded portion 13 on cylindrical container 12 is slidably mounted on the elongated rod 33 and spaced from the handle 34 by a small coil spring 36. A small protuberance 37 is formed, as by swaging, at a predetermined intermediate point on the elongated rod 33 for a purpose described in further detail below. Rod 33 also has an annular groove 38 formed between the protuberance 37 and forward end thereof.

A plunger represented generally by the numeral 39 is slidably mounted on elongated rod 33, consisting of a rubber plunger member 41, a cup washer 42, a backing washer 43 and a sleeve follower 44. Plunger member 41 is sized and shaped for sealed, sliding movement within the grease cartridge 14. The extreme forward tip of elongated rod 33 is swaged to form protugerances 45 which both retain plunger 39 and enable it to be retracted by pulling handle 34.

A coil spring 46 normally biases or urges the plunger 39 forwardly to continuously force grease from the cartridge 14 to be received into the head and handle assembly 17 through opening 27.

Filling the grease gun 11 with a fresh cartridge 14 is accomplished by first unscrewing the head and handle assembly 17 from the forward end of cylindrical container 12. Next, elongated rod 33 is retracted by pulling on handle 34 until the annular groove 38 registers with the opening in threaded cap 35. This action holds the plunger member 42 in close proximity to threaded cap 35 thereby allowing adequate space in cylindrical container 12 for the insertion therein of cartridge 14. Then, the protective end cap 16 of a fresh cartridge 14 is removed, and the cartridge is inserted into the cylindrical container 12 open end first. The exposed end cap 15 is then removed, and head and handle assembly 17 is screwed into place. At this point, any air entrapped in the container 12 between assembly 17 and the forward end of cartridge 14 is released through vent hole 19, thus precluding a subsequent air lock within the unit that would otherwise be caused by such entrapped air.

Handle 34 is then manipulated to release the annular groove 38 from cap 35, which causes plunger 39 to be urged forward by the coil spring 46 into engagement with the open end of cartridge 14. Because of the necessary tight fit of the plunger member 41 in cartridge 14, the plunger 39 will not under normal circumstances enter the open end of cartridge 14 by the urging of spring 46. To positively insert plunger 39 into a proper position within cartridge 14, handle 34 is pushed forwardly until protuberance 37 abuttably engages the sleeve follower 44 of plunger 39 (FIG. 2). At this point, elongated rod 33 is in its normal guide position to insure that entry of the plunger 39 into the cartridge 14 will be aligned and proper. Handle 34 is then pushed further, and the abutting engagement of protuberance 37 with sleeve follower 44 forces plunger 39 into the open end of cartridge 14 until the grease cannot be further compressed. Gun 11 is at this point ready for use, and spring 46 will continuously urge plunger 39 forwardly to force grease from the cartridge 14 into the assembly 17 as needed.

As shown in FIG. 2, the intermediate point at which protuberance 37 is disposed on elongated rod 33 is chosen so that plunger 39 will just enter the cartridge 14 when the rod 33 reaches its normal guiding position.

In FIG. 4, an alternative embodiment for effecting positive placement of the plunger into a new grease cartridge is shown. In this embodiment, like components are represented by like numerals with addition of the letter *a*. With the exception of elongated rod 33*a*, the structure of grease gun 11*a* is identical to that of grease gun 11. In place of protuberance 37, elongated rod 33*a* has a sleeve 47*a* having a diameter equal to that of sleeve follower 44*a*. Sleeve 47*a* is staked or otherwise secured to rod 33*a* in a position whereby its forward end is disposed at essentially the same point as the protuberance 37 of grease gun 11. The opening in cap 35*a* is sufficiently large to allow sleeve 47*a* to be retracted therethrough, and operation is in all respects the same with the sleeve 47*a* abuttably engaging the sleeve follower 44*a* with pushing or handle 34*a*.

From the foregoing, it will be appreciated that our invention enables the grease gun user to easily and positively insert the gun plunger into the mouth of a new cartridge, notwithstanding slight damage to the mouth or a burr or bead on its inside edge. This positive plunger insertion is accomplished with the elongated guide rod essentially in its normal operating position, thus placing the rod handle at a convenient operating point and assuring proper guided and aligned movement of the plunger upon insertion.

We claim:
1. A grease gun comprising:
   a. a cylindrical container having forward and rearward ends and adapted to receive an open ended cylindrical grease cartridge;
   b. discharge means including an outlet associated with the forward end of the cylindrical container for receiving grease from the cartridge and operable to discharge a quantity of grease to said outlet;
   c. an elongated rod disposed in the cylindrical container and longitudinally movable therein, one end of the elongated rod projecting beyond the rearward end of the cylindrical container;
   d. plunger means slidably disposed on the elongated rod and constructed for sealable slidable movement in the cartridge to force grease therefrom;
   e. means for urging the plunger means toward the forward end of the cylindrical container;
   f. and means disposed at an intermediate point on the elongated rod rearwardly of the plunger means and movable therewith for abuttably engaging and forcing the plunger means into the rearward open end of the grease cartridge with forward movement of the elongated rod.

2. The grease gun defined by claim 1, wherein said intermediate point is disposed to effect abutting engagement of the plunger means with the elongated rod in its approximate operating position.

3. The grease gun defined by claim 1, wherein the means for abuttably engaging the plunger means comprises a protuberance on the elongated rod.

4. The grease gun defined by claim 1, wherein the means for abuttably engaging the plunger means comprises a sleeve member affixed to the elongated rod, the forward end of the sleeve member being disposed at said intermediate point.

5. The grease gun defined by claim 1, wherein the discharge means is removably connected to the cylindrical container.

6. The grease gun defined by claim 1, wherein the discharge means comprises a cylinder commonly communicating with the cylindrical container and the outlet, and a manually operable piston sealably and slidably disposed in the cylinder.

7. The grease gun defined by claim 1, wherein the elongated rod further comprises a handle disposed on the rearward projecting end thereof.

8. The grease gun defined by claim 1, and further comprising means for venting air entrapped in the cylindrical container between the grease cartridge and the discharge means.

9. The grease gun defined in claim 8, wherein the venting means comprises a vent hole disposed in the wall of the cylindrical container at the forward end thereof.

10. The grease gun defined by claim 1, and further comprising a removable cap member covering the rearward end of the cylindrical container, the elongated rod projecting through said cap.

11. The grease gun defined by claim 10, wherein the urging means comprises a coil spring compressibly disposed between the plunger means and the removable cap.

* * * * *